July 20, 1937. H. A. TOULMIN, JR 2,087,391
METHOD FOR PRODUCTION OF CARBON BLACK
Filed Jan. 11, 1935
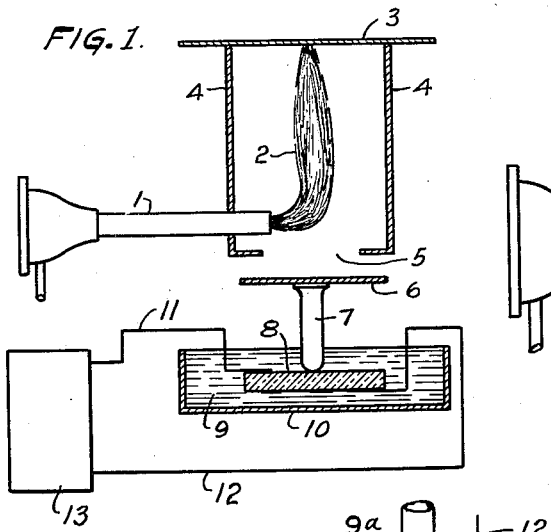
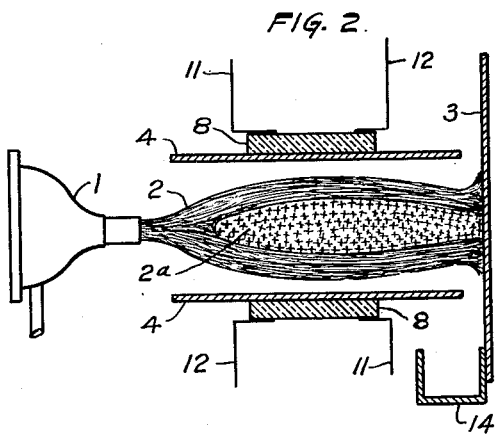
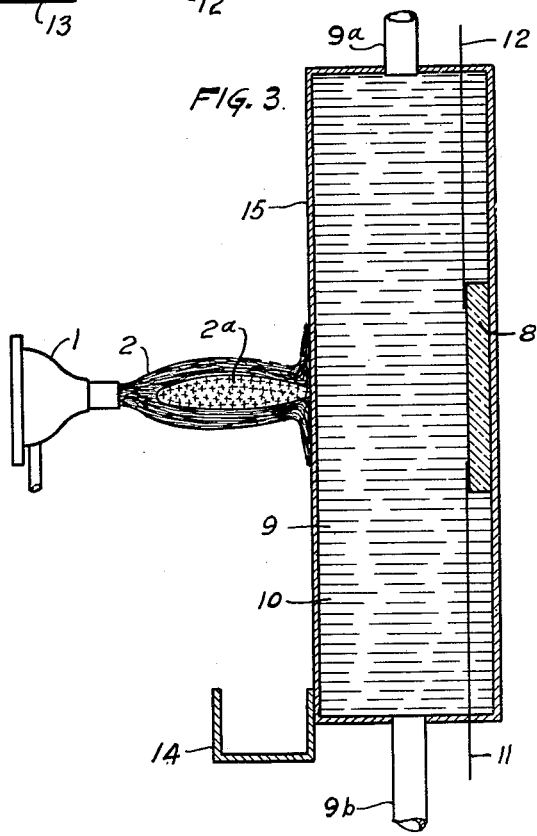
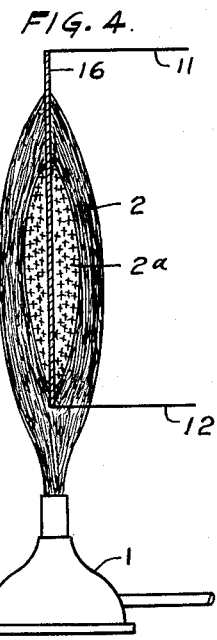
INVENTOR
HARRY A. TOULMIN, JR.
BY
Toulmin + Toulmin
ATTORNEYS Patented July 20, 1937

2,087,391

UNITED STATES PATENT OFFICE 2,087,391

METHOD FOR PRODUCTION OF CARBON BLACK

Harry A. Toulmin, Jr., Dayton, Ohio, assignor, by mesne assignments, to Commonwealth Engineering Corporation, Wilmington, Del., a corporation of Delaware

REISSUED
APR 2 2 1941

Application January 11, 1935, Serial No. 1,353

8 Claims. (Cl. 134—60)

This invention relates to a method for the production of carbon black.

It is the object of the invention to increase the production of carbon black, and to improve the quality of carbon black.

It is an object to provide for the removal of the carbon from the gas flame, and for removing the carbon as deposited on the collector plate from the vicinity of the gas flame, to thereby increase the quantity of carbon black and improve its quality.

In particular, it is the object of the invention to effect this removal by vibration of the flame, of the air in which the flame is located, and the plate on which the carbon black is collected. Any one or more of such media can be so vibrated.

It is the object of this invention to provide a very high rate of vibration, preferably, and vibrations of very short wave length.

It is an object to provide sonic vibrations for this purpose. I have found that, in particular, sonic vibrations of the wave length of 300 mu materially increase the deposition of carbon from a gas flame. I particularly find useful supersonic waves of high intensity for this purpose.

Referring to the drawing:

Figure 1 is a diagrammatic view of the apparatus employed, in which the air has imparted to it sonic vibrations: the collector box, vibration plate and vibration apparatus are shown in section.

Figure 2 is a modified form of applying sonic waves to the air confined in the area of the gas flame showing the vibrators, collector plate and collector trough in section.

Figure 3 illustrates a form in which the sonic vibrations are directly applied to the plate on which the carbon black is collected: the vibrator and collector are shown in section.

Figure 4 is a modification showing the arrangement of the collector plate in the flame, bisecting the flame: the plate is shown in section.

Referring to the drawing in detail, I designates a source of gas supply having a flame 2, which impinges upon a collector plate 3, and which is inclosed within the walls 4. The bottom of the box formed by the walls 4 and plate 3 is provided with an opening 5 for receiving the vibrations from the sonic vibrator plate 6 mounted on the glass tube 7. This tube is mounted upon the quartz crystal sonic vibrator 8, which is immersed in an oil bath 9 in the container 10. The wires 11 and 12 lead from sonic vibration apparatus, designated 13. Such an apparatus may be of any desired character, but I have found that set forth and described in the patent of Alfred L. Loomis and Robert Williams Wood, No. 1,734,975, of November 12, 1929, satisfactory.

I have found that by producing in any manner compression waves of high frequency and applying such waves to the gas flame, the air surrounding the gas flame or the collector plate will materially improve the production of carbon black. This is apparently due to the fact that the carbon black is removed rapidly from the combustion zone of the flame to a point where it will not be affected by the flame, and therefore the high loss, either in the flame or due to the impingement of the flame on carbon black deposited on the collector plate, is eliminated.

The essence of my method is the formation of free carbon in the flame by combustion of the gas in the presence of another gas, and the rapid mechanical extraction from the zone of the flame where it will be combustible into the zone of the other gas, where it is not combustible, thereby preserving the integrity of the deposit.

It is obvious that this invention is applicable to other uses than that of removing carbon black from a flame, and is adaptable to the use of causing the deposit of material in one gas stream into another gas stream, or into some other place of collection.

Referring to Figure 2, it will be noted that the sonic vibrators 8 are applied on the side walls 4. By a careful adjustment of the rate of vibration of these sonic vibrators, either in synchronism with one another or out of synchronism with one another, and the adjustment of the size of the flame and the amount of the air admitted to the presence of the flame, the carbon black can be controlled as to its quantity and quality. In this form the carbon black imping- ing upon the collector plate, which in this instance is the plate 3, is collected in the trough 14.

Turning to Figure 3, there will be seen in this form the use of the sonic vibrator and the liquid as the direct support for the collector plate, and therefore the sonic vibrations are applied directly to the collector plate, designated in this view 15. The flame 2 having the carbon area 2a impinges upon the plate 15, which is mounted over the oil bath 9, that is set in motion by the sonic vibrator 8. If desired, this oil 9 may be circulated through the pipes 9a and 9b in order to maintain the temperature of the plate 15 at the desired point. The carbon black is deposited in the trough 14, due to the vibrations which cause it to collect not only on the plate 15 but also to descend into the trough 14.

The form shown in Figure 3 is, of course, associated with an inclosure to regulate the amount of air admitted to the flame in order to get the usual conditions for the production of carbon black.

In Figure 4 a sonic vibrator plate 16 is shown suspended in the flame bisecting the carbon area 2a. This is another form that is advantageous under certain conditions, particularly where there is a plurality of flames burning in a single inclosure.

In the practice of this invention the quantity and the quality of the carbon black can be controlled by the rate of vibration, the location of the vibrating means, the control of the size of the gas flame, the amount of air admitted to the chamber in which the flame is located, and the location of the source of supersonic vibrations with respect to the collector plate, the flame and the gas in which the flame is burning. I have found that supersonic acoustic waves increase the production of carbon black.

I desire to comprehend within my invention such modifications as may be embraced within my claims and the scope of my invention.

Having thus fully described my invention, what I claim as new and desire to secure by Letters Patent, is:

1. In a method of producing carbon black, burning a gas flame for the production of carbon particles, and mechanically shaking the carbon particles from the flame by subjecting the flame to mechanical supersonic vibrations of a frequency higher than audible frequencies.

2. In a method of producing carbon black, applying a gas flame to a collecting plate, inclosing the flame for adjusting the amount of air admitted for combustion, and mechanically shaking the carbon particles from the flame by subjecting the flame to mechanical supersonic vibrations of a frequency higher than audible frequencies.

3. In a method of producing carbon black, impinging a burning gase flame upon a collector plate, and mechanically shaking the carbon particles from the flame by subjecting the plate to mechanical supersonic vibrations of a frequency higher than audible frequencies.

4. In a method of producing carbon black, burning a gas flame in a region with an oxygen content less than air, and mechanically shaking the carbon particles from the flame by subjecting the flame to mechanical vibrations of a frequency higher than audible frequencies.

5. In a method of producing carbon black, burning a gas flame in a region of reduced oxygen, mechanically shaking the carbon particles from the flame by subjecting the flame to mechanical vibrations of a frequency higher than audible frequencies, and collecting the carbon black by causing the flame to impinge upon a collector plate.

6. In a method of producing carbon black, burning a gas flame in a medium comprising a restricted space of reduced oxygen content, and mechanically shaking the carbon particles from the flame by subjecting the flame to mechanical vibrations by applying to the medium mechanical vibrations of a frequency higher than audible frequencies.

7. In a method of producing carbon black, causing a carbon-producing flame to impinge upon a metal plate, and mechanically shaking the carbon particles from the flame by applying to the plate high frequency mechanical vibrations having a frequency higher than audible frequencies.

8. In a method of producing carbon black, mechanically shaking the carbon particles from the flame by applying to a liquid medium mechanical vibrations of a frequency higher than audible frequencies, passing the compression waves formed thereby through the liquid, imparting such waves to a collector plate, impinging on the collector plate a carbon-producing gas flame, and collecting from the flame and the plate the carbon thus produced and deposited.

HARRY A. TOULMIN, Jr.